Figure 1:
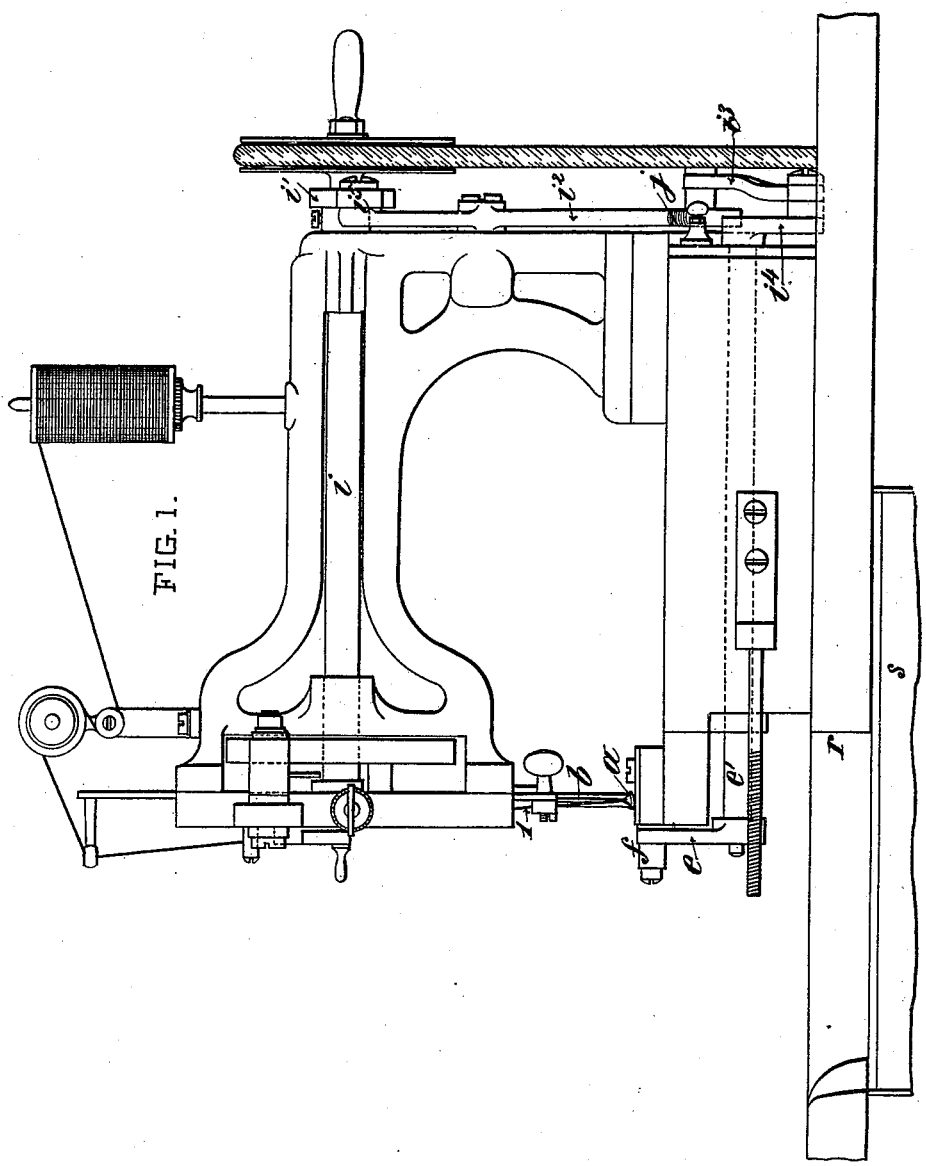

(No Model.) 7 Sheets—Sheet 1.
E. KLOTZ, J. LANDRY & G. F. BEYROUX.
MACHINE FOR SEWING TUBULAR ARTICLES.

No. 562,084. Patented June 16, 1896.

Witnesses:
L. M. Wachschlager
Chas. Lyon Russell

Inventors
Eugene Klotz
Justin Landry
Gabriel F. Beyroux
by their attorneys
Briesen & Knauth

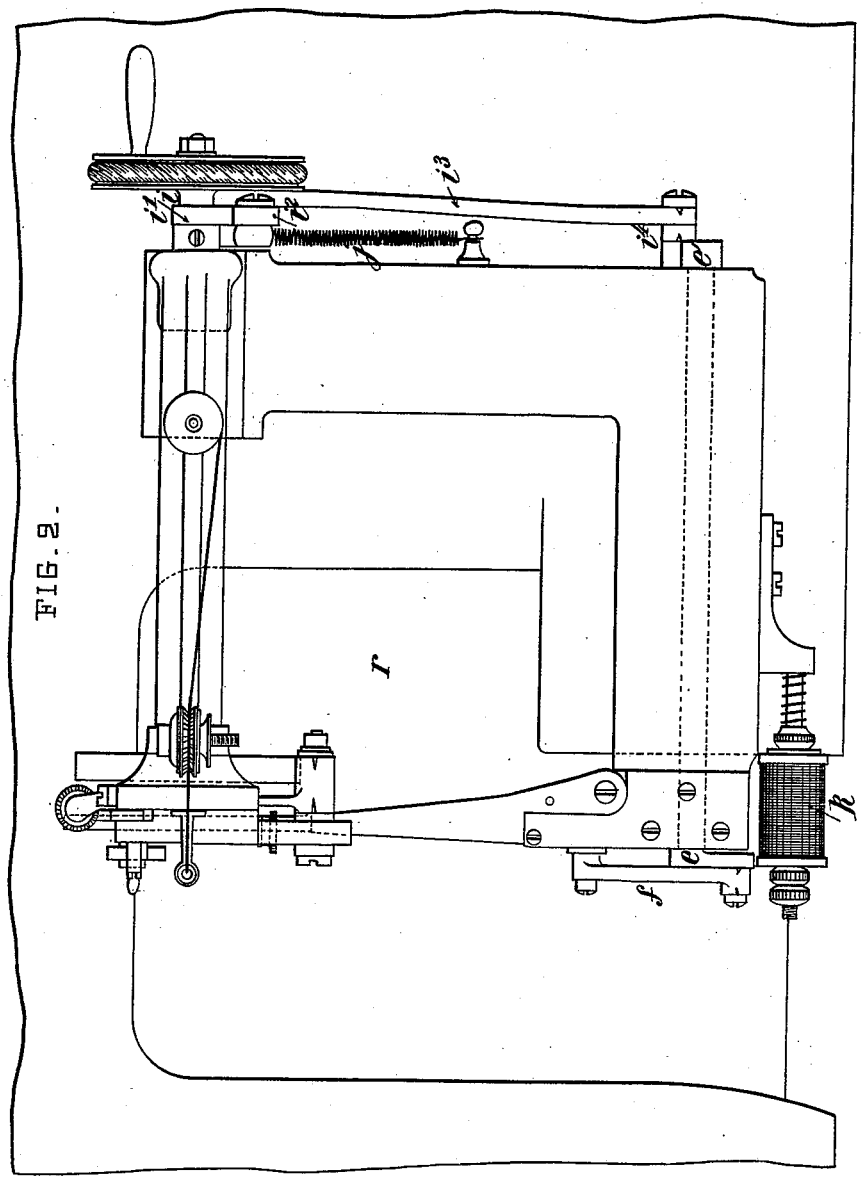

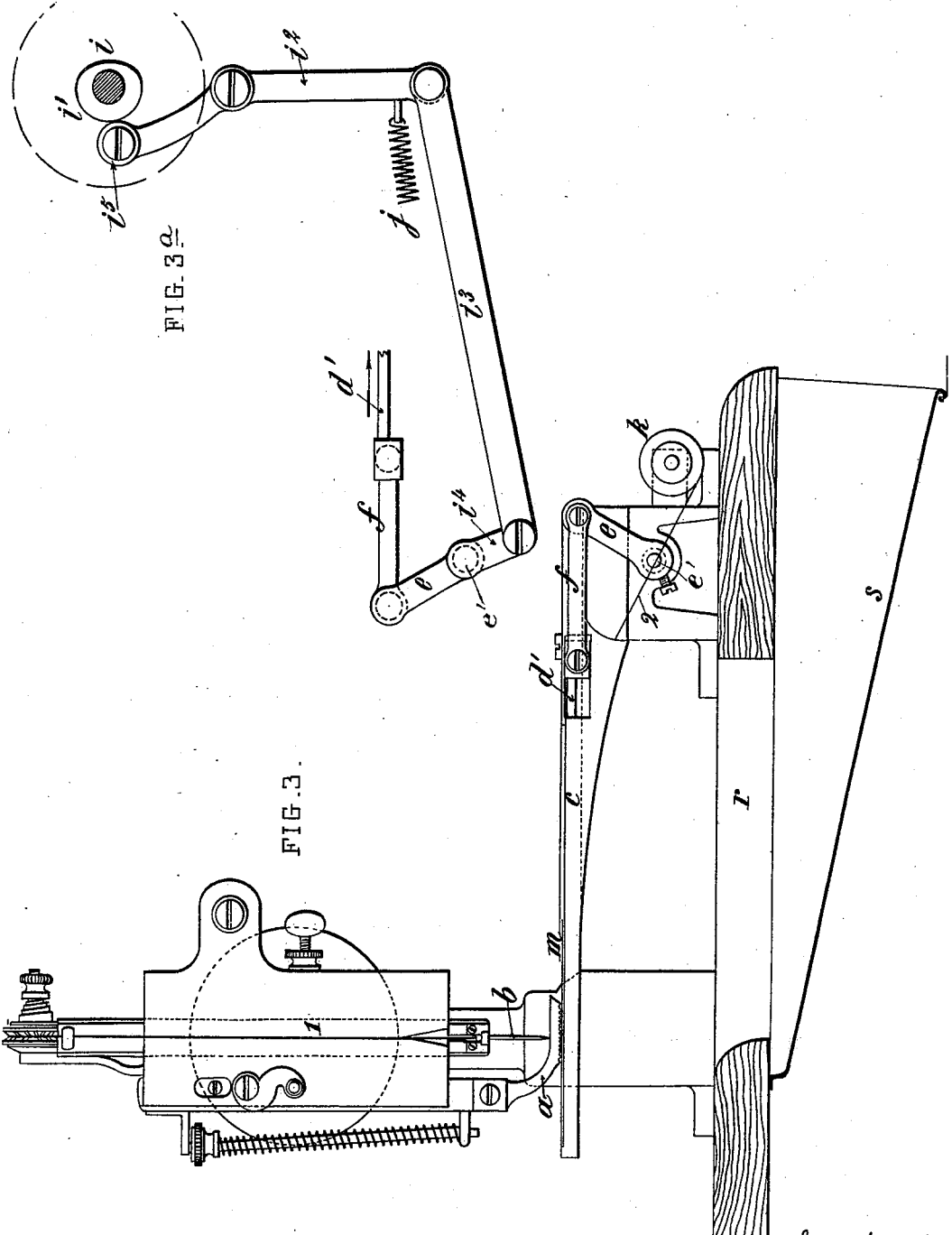

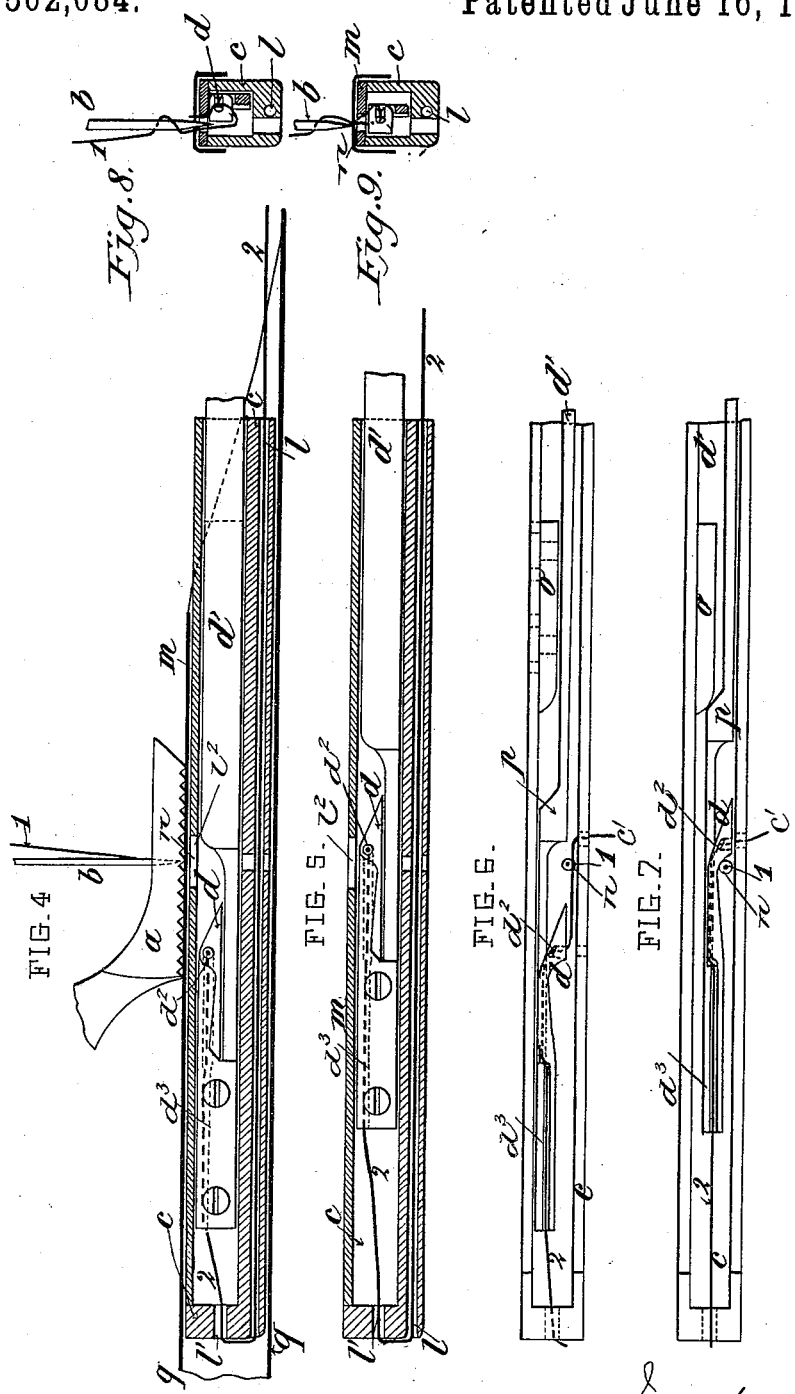

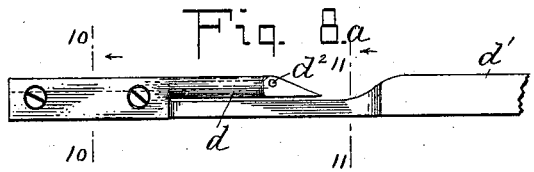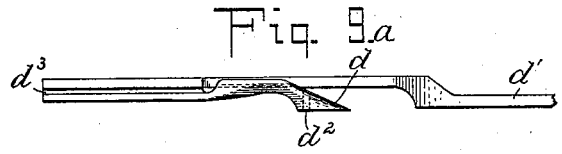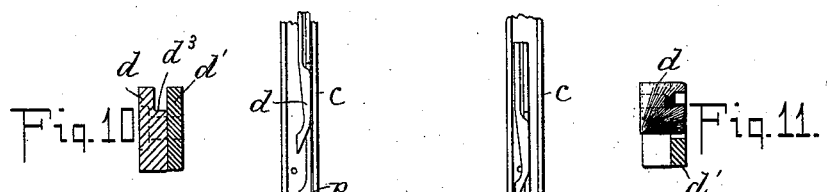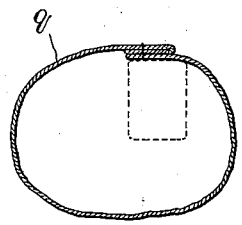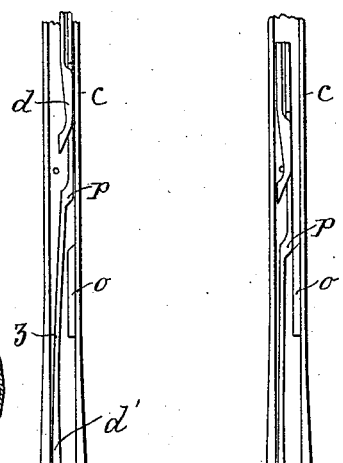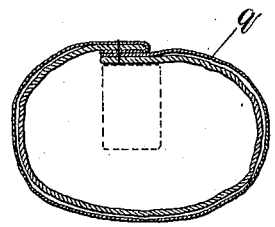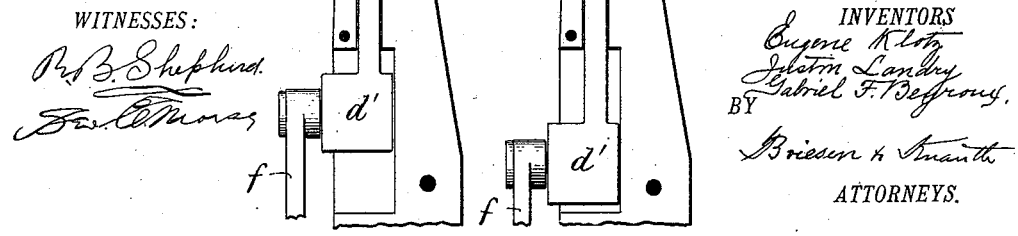

(No Model.) 7 Sheets—Sheet 6.
E. KLOTZ, J. LANDRY & G. F. BEYROUX.
MACHINE FOR SEWING TUBULAR ARTICLES.
No. 562,084. Patented June 16, 1896.
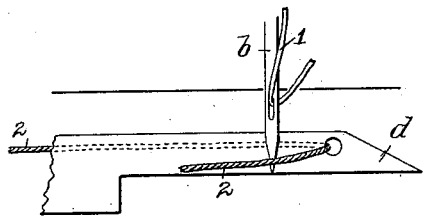
Fig. 16.
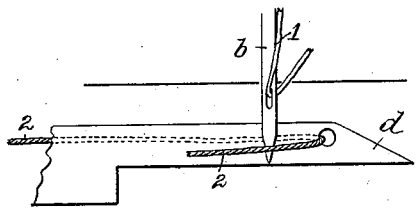
Fig. 17.
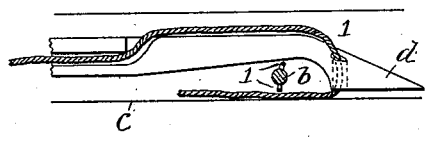
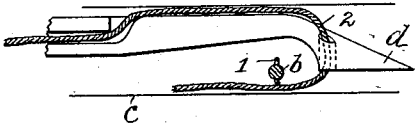
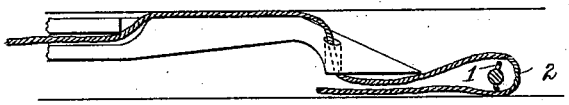
Fig. 18.
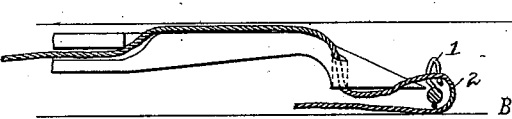
Fig. 19.
WITNESSES:
INVENTORS
Eugene Klotz,
Justin Landry,
Gabriel F. Beyroux,
BY
Briesen & Knauth
ATTORNEYS.

(No Model.) 7 Sheets—Sheet 7.
E. KLOTZ, J. LANDRY & G. F. BEYROUX.
MACHINE FOR SEWING TUBULAR ARTICLES.
No. 562,084. Patented June 16, 1896.
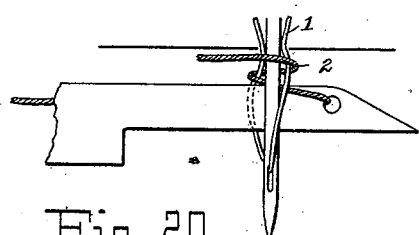
Fig. 20.
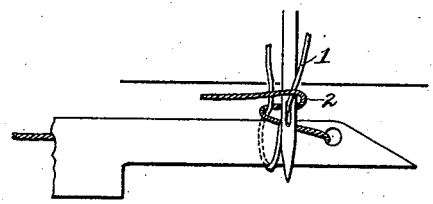
Fig. 21.
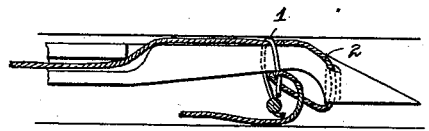
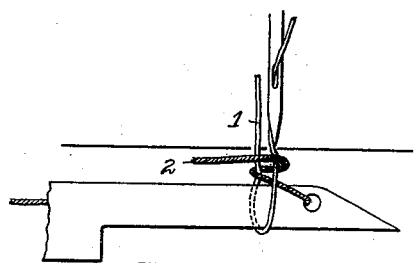
Fig. 22.
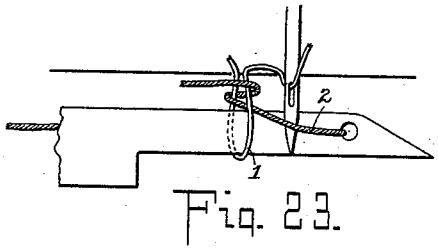
Fig. 23.
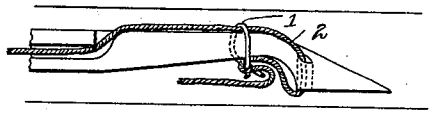
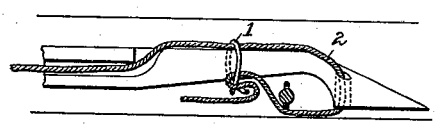
WITNESSES:
*R. B. Shepherd.*
*Geo. E. Morse*
INVENTORS
*Eugene Klotz,*
*Justin Landry,*
BY *Gabriel F. Beyroux,*
*Briesen & Knauth*
ATTORNEYS

UNITED STATES PATENT OFFICE.

EUGENE KLOTZ, JUSTIN LANDRY, AND GABRIEL FRANÇOIS BEYROUX, OF PARIS, FRANCE.

MACHINE FOR SEWING TUBULAR ARTICLES.

SPECIFICATION forming part of Letters Patent No. 562,084, dated June 16, 1896.

Application filed September 14, 1892. Serial No. 445,847. (No model.)

*To all whom it may concern:*

Be it known that we, EUGENE KLOTZ, JUSTIN LANDRY, and GABRIEL FRANÇOIS BEYROUX, of the city of Paris, France, have invented an Improved Machine for Sewing Tubular Articles, of which the following is a full, clear, and exact description.

This invention relates to an improved machine for sewing articles in the form of a tube or sheath, and more particularly the neckbands of made-up cravats or scarfs. These neckbands are made of a strip of fabric which is formed into a tube by sewing the edges together at the same time that the inner lining is secured in place, the width of the band being gradually diminished toward the end in which the metallic stiffening is to be inserted. In the manufacture of this particular article it is important that the stitching should be as invisible as possible, but this result has hitherto been obtained by hand-sewing in the case of articles of superior quality. The machine of this invention is designed to perform this operation under the most perfect and advantageous conditions by means of an attachment comprising an elongated narrow work-supporting tube, upon which the sewing of the band is effected and which serves externally to guide the neckband to be sewed and internally to guide a thread-carrying hook-shaped spring-looper, which coöperates with the needle to form the two-thread chain-stitch, as hereinafter described.

Reference is to be had to the accompanying drawings, forming part of this specification, in which—

Figure 1 represents a side elevation, Fig. 2 a plan, and Fig. 3 an end view, of the machine. Fig. $3^a$ is a detail side view of certain features which will be hereinafter described. Figs. 4 and 5 are diagrammatic longitudinal sections, showing the method of threading the machine, the looper being shown in outline merely for the purpose of clearer illustration. Figs. 6 and 7 are plans of a similar character with the cover-plate of the work-supporting tube on which the sewing is effected removed, drawn to a larger scale. Figs. 8 and 9 are transverse sections of the same, showing the needle in two positions. Fig. $8^a$ is an isometric side elevation of the hook-shaped spring-looper. Fig. $9^a$ is an isometric plan or top view of the same. Figs. 10 and 11 are sections of the hook-shaped spring-looper taken on lines 10 10 and 11 11, respectively, of Fig. $8^a$. Fig. 12 is a plan view showing the hook-shaped spring-looper and its operating mechanism within the work-supporting tube, the cover-plate of the tube being removed. Fig. 13 is a plan view similar to Fig. 12, showing the hook-shaped spring-looper in a different position from that shown in Fig. 12. Fig. 14 is a sectional view showing the tubular article as sewed upon the machine. Fig. 15 is a section of a similar article, showing the same as provided with a lining. Figs. 16 to 23 are diagrammatic views showing in detail the manner of forming the stitch.

The feed by means of the foot $a$, which works longitudinally on the outside of the work-supporting tube, the regulation of the feed, and the mechanism for operating the needle $b$ and supplying it with thread may be all of the ordinary kind and need no specific description.

The strip of fabric to be sewed is placed upon a work-supporting tube $c$, in which is contained the mechanism for forming the stitch, said tube being fixed upon the table of the machine and the movable foot $a$ or feed-claw bearing upon its outer portion, as shown more clearly in Fig. 3, and constituting the sole feeding means for the work.

Within the work-supporting tube $c$ a hook-shaped spring-looper $d$ (comprising a thread-carrying hook and a spring hook-carrier) receives a horizontal reciprocating movement timed with regard to the vertical movement of the needle by means of a rocking arm $e$, connected by a link $f$ to the end of the hook-carrier $d'$, Fig. $3^a$, the motion being transmitted to said arm $e$ from the driving-shaft $i$ by means of cam $i'$, lever $i^2$, terminating in a bowl $i^5$, held up to the cam by a spring $j$ and connecting-rod $i^3$, which is jointed to an arm $i^4$, fast on the shaft $e'$ of arm $e$. (See Fig. 1.) This hook-carrier $d'$ is of spring metal and is bent slightly out of alinement, as shown at $z$ in Fig. 12, and is provided with an abutment $p$, said bend causing the abutment to coöp- erate with the incline $o$ to move the looper laterally in the tube as the hook-carrier is reciprocated.

The needle-thread 1 is supplied in the ordinary manner, and the under thread 2 is led from spool $k$ into the tube $c$ (see Fig. 3) through a longitudinal channel $l$, Figs. 4 and 5, formed in the bottom of the tube $c$ to its front end, where it enters through a central hole $l'$, and thence to the eye $d^2$ of the looper (hook) $d$, to which it is guided by groove $d^3$, formed on the head of the looper, whence it passes out of the tube to the fabric through an elongated hole $l^2$ in the removable cover-plate $m$ of the tube. In threading the machine the end of the under thread is passed through the longitudinal channel $l$ of the tube by means of a threader formed of a flexible wire provided with an eye at its extremity like that of an ordinary needle. The thread 2 at first, before starting the machine, is brought out after it has been threaded into the looper, through a side hole $c'$, (see Figs. 6 and 7,) where the end of the thread remains under control until it is engaged by the needle-thread, which pulls it out of hole $c'$.

The stitch is formed as follows: The needle descending carries its thread 1 through the fabric and behind the heel of the looper $d$, between the said hook and its thread 2, (see Fig. 16,) the tube being perforated at $l^2$ (see Fig. 4) for the descent of the needle. As the needle descends to the position of Fig. 17 the looper receives a lateral movement away from the needle by the coöperation of the abutment and incline. As the needle continues to descend the looper $d$ recedes until its point has cleared the needle, Fig. 18. The two threads are now in the position shown in Fig. 18, the fabric being traversed by the needle-thread only, the needle having passed through the loop in the looper-thread 2 and this thread 2 being round the needle and the loop of the needle-thread 1, as clearly shown in Fig. 18. The needle is now in its lowest position. The needle now begins to rise and the looper to move forward, and as the needle rises it forms a loop in its thread 1, through which the point of the looper passes as the looper moves forward, Figs. 19 and 20. As the needle rises the looper recedes and at the same time receives a lateral movement toward the needle next assuming the position of Fig. 21. The needle continuing to rise passes out of the fabric, Fig. 22, leaves its loop upon the looper, and passes out of the loop formed in the looper-thread 2, which loop remains wrapped around the bight of the needle-thread 1, all of which is clearly shown in Fig. 22. The looper again begins to recede and the needle again begins to descend, (see Fig. 23,) passing behind the heel of the looper $d$, between the hook and its thread 2, whereupon the looper is entirely retracted through the various positions shown in Figs. 16, 17, and 18, the loop of the needle-thread 1 passing off of the looper as during its receding movement the looper receives a lateral movement away from the needle, which combined longitudinal and lateral movement greatly facilitates the escape of the needle-thread loop from the looper.

In forming subsequent stitches the above-described operations are again repeated. The stitch is tightened at the proper time by the usual take-up and tension mechanism.

The two edges of the strip of fabric $q$, Fig. 4, are thus stitched together upon the upper side of the tube $c$ and form a tubular neck-band.

To facilitate the work, the table $r$ of the machine is cut away beneath the tube and an inclined chute $s$ provided for the finished band to pass out as the work progresses.

Having described our invention, what we claim is—

In a machine for sewing neckbands of cravats, the combination with a vertically-reciprocating needle and an elongated, narrow work-supporting tube, of a thread-carrying, hook-shaped, spring looper having an abutment thereon and extending and guided longitudinally within the tube, an incline upon the interior of the tube coöperating with the abutment on the looper to deflect the latter during the formation of the stitch, mechanism for reciprocating the looper, and feeding mechanism working longitudinally, and on the outside of said tube.

The foregoing specification of our improved machine for sewing tubular articles signed by us this 24th day of August, 1892.

EUGENE KLOTZ.
JUSTIN LANDRY.
GABRIEL FRANÇOIS BEYROUX.

Witnesses:
 ROBT. M. HOOPER,
 PIERRE ERNEST CISSIER.